United States Patent
Dall'Abaco et al.

(10) Patent No.: US 12,448,499 B2
(45) Date of Patent: Oct. 21, 2025

(54) TYRE FOR VEHICLE WHEELS

(71) Applicant: Pirelli Tyre S.p.A., Milan (IT)

(72) Inventors: Davide Dall'Abaco, Milan (IT); Luigia Rossiello, Milan (IT); Marco Pozzoli, Milan (IT); Davide Lupo Conti, Rome, GA (US)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 17/271,065

(22) PCT Filed: Aug. 29, 2019

(86) PCT No.: PCT/IB2019/057291
§ 371 (c)(1),
(2) Date: Feb. 24, 2021

(87) PCT Pub. No.: WO2020/044283
PCT Pub. Date: Mar. 5, 2020

(65) Prior Publication Data
US 2021/0324180 A1    Oct. 21, 2021

(30) Foreign Application Priority Data
Aug. 30, 2018    (IT) .................. 102018000008241

(51) Int. Cl.
*B60C 1/00*    (2006.01)
*B29D 30/72*    (2006.01)
(Continued)

(52) U.S. Cl.
CPC ............... *C08L 7/00* (2013.01); *B29D 30/72* (2013.01); *B60C 1/0025* (2013.01);
(Continued)

(58) Field of Classification Search
CPC ... B60C 13/04; B60C 2013/045; B60C 13/00; B60C 13/001; B60C 13/002; B60C 13/02; B29D 30/72; B29D 30/726
See application file for complete search history.

(56) References Cited

U.S. PATENT DOCUMENTS

| 4,550,142 A | 10/1985 | Akita et al. |
| 4,742,124 A | 5/1988 | Tsutsumi et al. |

(Continued)

FOREIGN PATENT DOCUMENTS

| CN | 102066136 A | 5/2011 |
| DE | 202011110368 | * 12/2011 |

(Continued)

OTHER PUBLICATIONS

Office Action dated Dec. 23, 2021, from the Federal Service for Intellectual Property in corresponding Russian Application No. 2021107410/04.

(Continued)

*Primary Examiner* — Blaine Copenheaver
*Assistant Examiner* — Thomas Frank Schneider
(74) *Attorney, Agent, or Firm* — Finnegan, Henderson, Farabow, Garrett & Dunner, L.L.P.

(57) ABSTRACT

The present disclosure relates to a tyre comprising a carcass structure, a tread band, a pair of sidewalls and at least one colored decorative element having a thickness equal to or greater than 200 μm applied by co-vulcanization on at least one side of the pair of sidewalls, wherein the pair of sidewalls comprises an elastomeric composition comprising (i) at least one diene elastomeric polymer, and (ii) an ozone protection system, and the at least one colored decorative element is made with a cross-linkable elastomeric composition comprising (i) 100 phr of elastomeric polymer comprising 30 phr to 70 phr of natural and/or synthetic isoprene (Continued)

rubber, and 30 phr to 70 phr of a rubber chosen from butyl rubber, halobutyl rubber, butadiene rubber, styrene-butadiene rubber, and mixtures thereof, and (ii) 5 phr to 120 phr of at least one reinforcement filler.

18 Claims, 3 Drawing Sheets

(51) Int. Cl.
 B60C 13/00 (2006.01)
 B60C 13/04 (2006.01)
 C08L 7/00 (2006.01)
 C08L 9/00 (2006.01)
 C08L 15/02 (2006.01)
(52) U.S. Cl.
 CPC .............. *B60C 13/001* (2013.01); *C08L 9/00* (2013.01); *C08L 15/02* (2013.01); *B29D 2030/726* (2013.01); *B60C 2013/045* (2013.01); *C08L 2201/08* (2013.01); *C08L 2205/03* (2013.01)

(56) References Cited

U.S. PATENT DOCUMENTS

| | | | |
|---|---|---|---|
| 4,967,818 A * | 11/1990 | Gartland | B60C 13/04 152/DIG. 12 |
| 5,300,164 A | 4/1994 | DeTrano et al. | |
| 5,474,645 A | 12/1995 | Bohm et al. | |
| 5,591,513 A | 1/1997 | Mahling | |
| 6,030,676 A | 2/2000 | Cottin et al. | |
| 6,080,465 A | 6/2000 | Boissonnet et al. | |
| 7,387,144 B2 | 6/2008 | Byrne | |
| 8,037,916 B2 | 10/2011 | Symens et al. | |
| 8,834,974 B1 | 9/2014 | Ferry et al. | |
| 2004/0103974 A1 | 6/2004 | Majumdar et al. | |
| 2007/0256771 A1* | 11/2007 | Balogh | B60C 1/0025 156/116 |
| 2014/0090763 A1* | 4/2014 | Sugimoto | B60C 19/00 152/450 |
| 2016/0032151 A1 | 2/2016 | Uang | |
| 2016/0121661 A1* | 5/2016 | Oshikane | B60C 13/04 152/524 |
| 2016/0177070 A1* | 6/2016 | Galizio | C08K 3/22 524/21 |
| 2017/0361663 A1 | 12/2017 | Stuckey | |
| 2019/0381832 A1* | 12/2019 | Dall'Abaco | C08K 5/15 |

FOREIGN PATENT DOCUMENTS

| | | | | |
|---|---|---|---|---|
| EP | 0 249 918 A2 | | 12/1987 | |
| EP | 0636647 A1 | * | 2/1995 | |
| EP | 1073031 A1 | * | 1/2001 | ........... B60C 13/001 |
| EP | 2522496 A2 | * | 11/2012 | ............. B29D 30/72 |
| GB | 945978 A | | 1/1964 | |
| JP | 2009221248 A | * | 10/2009 | |
| RU | 2239559 C2 | | 11/2004 | |
| RU | 2677170 C1 | | 1/2019 | |
| WO | WO 2009/154607 A | | 12/2009 | |
| WO | WO 2013/093896 A1 | | 6/2013 | |
| WO | WO2018163041 | * | 9/2018 | |

OTHER PUBLICATIONS

Huo, Y, "Design and Manufacture of Rubber Products", Chemical Industry Press, May 1984, 1$^{st}$ Edition, Apr. 1998, pp. 99-100.
International Search Report form the European Patent Office in corresponding International Application No. PCT/IB2019/057291 mailed Oct. 28, 2019.
Written Opinion of the International Searching Authority from the European Patent Office in corresponding International Application No. PCT/IB2019/057291 mailed Oct. 28, 2019.
Notification of the First Office Action issued by the China National Intellectual Property Administration on Oct. 26, 2022, in corresponding Application No. CN 201980054754.6 (8 pages).

* cited by examiner

TYRE FOR VEHICLE WHEELS

This application is a national stage entry application under 35 U.S.C. § 371 based on International Application No. PCT/IB2019/057291, filed Aug. 29, 2019, and claims priority to Italian Patent Application No. 102018000008241, filed Aug. 30, 2018; the contents of each application is incorporated herein by reference.

FIELD OF THE INVENTION

The present invention relates to a tyre for vehicle wheels comprising at least one colored decorative element on at least one sidewall of said tyre.

More particularly, the present invention relates to a tyre for vehicle wheels obtained by bringing a layer of a green or partially vulcanised elastomeric composition into contact with the sidewall of a green tyre, and co-vulcanising said layer together with said green tyre.

PRIOR ART

Tyres for vehicle wheels comprising one or more white or colored decorative elements arranged on the sidewall of the tyre itself are known in the art. The sidewall of the tyre may have isolated white or colored decorative elements (such as letters, numbers, stripes or logos) or be completely covered with a white or variously colored layer.

Typically, such decorative elements may be made by applying to one sidewall of the green tyre a layer of vulcanisable polymeric material comprising colored or white pigments and subsequent co-vulcanisation during the process of making the finished tyre.

Tyres with a colored outer surface made with such a manufacturing method are described, for example, in U.S. Pat. No. 5,474,645, US 2007/256771, US 2004/103974, US 2016/032151, EP2522496, and EP0249918 which describe a tyre comprising a vulcanised rubber surface coated with a colored coating with an elastomeric base.

Alternatively, the colored outer surface is made by applying to one side of the vulcanised tyre a paint or layer of adhesive cross-linkable polymeric material comprising colored or white pigments, and subsequently activating the cross-linking. Tyres with a colored outer surface made with this manufacturing method are described, for example in U.S. Pat. Nos. 5,300,164, 6,030,676, 6,080,465, 8,834,974.

In some cases, as for example in GB945978, EP2522496 A2, EP249918 A2, WO2013/093896, U.S. Pat. Nos. 5,474, 645 and 5,591,513, the use of a barrier layer interposed between the outer surface of the tyre and the colored coating has been suggested, this barrier layer generally comprising halogenated rubbers, such as polychloroprene and chlorobutyl rubbers.

Alternatively, as described for example in U.S. Pat. Nos. 8,037,916, 7,387,144 and US20170361663, after the vulcanisation, colored labels, such as, for example, strips, writings, logos, decals, barcodes and the like, consisting of one or more colored layers and an adhesive layer for application to the sidewall, may also be applied to the sidewalls of the tyres for vehicle wheels.

SUMMARY OF THE INVENTION

According to the Applicant, the tyres comprising colored decorative elements (among these also including whites) described above may have some drawbacks.

For example, the Applicant has noted that the colored compositions may have discoloration problems due to the migration of staining agents to the visible surface, typically represented by (i) antioxidants or antiozonants based on aromatic amines and (ii) waxes or other static protective agents polymers usually present in the elastomeric compositions, in particular those used in the manufacture of tyres, even in the presence of barrier layers that cannot prevent the above migration.

Moreover, difficulties have been encountered in obtaining a good adhesion between the colored compositions and the surface of the vulcanised tyre to be coated, both in the case of co-vulcanisation, due to the different polymeric composition, in particular with the use of barrier layers based on halogenated rubbers, and in the case of cross-linking, due to the lower bonding strength, and in the case of adhesive labels, due to the repeated cyclic deformation of the tyre sidewall and to the temperature changes that occur during use of the tyre.

Moreover, if during use the side of the tyre comes into contact with a curb, a sidewalk or other abrasive surfaces, the decorative elements easily tend to get scratched and damaged, and similar phenomena can occur during car washing due to the action combined water and detergents with abrasive agents (brushes and/or sponges).

The Applicant has also observed that the application of adhesive labels entails a greater complication of the tyre manufacturing steps, through the use of special stations for gluing the labels to the sidewalls of the tyre, preceded by cleaning operations of the tyre sidewall and adaptation of the operation to the size of the tyre, with consequent decrease in productivity and increase in costs.

The Applicant has now found that it is possible to overcome the drawbacks reported above by making a tyre comprising a pair of sidewalls and at least one colored decorative element having a thickness equal to or greater than 200 µm (micrometres) directly applied by co-vulcanisation on at least one side of said pair of sidewalls, wherein said pair of sidewalls comprises an elastomeric composition comprising (i) at least one diene elastomeric polymer, and (ii) an ozone protection system, and said at least one decorative element is made with a cross-linkable elastomeric composition comprising (i) 100 phr of elastomeric polymer comprising 30 to 70 phr of natural and/or synthetic isoprene rubber, and 30 to 70 phr of a rubber selected from the group consisting of butyl rubber, halobutyl rubber, butadiene rubber, styrene-butadiene rubber, and mixtures thereof, (ii) 5 to 120 phr of at least one reinforcement filler, (iii) optionally, at least 0.5 phr of at least one coloring agent, and (iv) optionally, a non-staining ozone protection system.

The Applicant has found that the elastomeric composition of the sidewall and the elastomeric composition of the decorative element were fully compatible with each other and that the co-vulcanisation allowed obtaining an excellent adhesion between the decorative element and the sidewall, solving the problems of adhesion and detachment known in the art.

Moreover, the Applicant has observed that the thickness of the decorative element and the mass coloring of the elastomeric composition imparted to the element itself a good resistance to abrasion and to the impacts inevitably suffered in the conditions of use of the tyre itself and at the same time prevented the color removal easily achievable in case of application of paints and/or thin layers of pigments on the sidewall surface.

Advantageously, the Applicant has also found that the use of a cross-linkable composition comprising a non-staining ozone protection system for making the sidewall allowed eliminating or at least reducing the discoloration and/or alteration of the sidewall color, but above all of the decorative element applied thereto.

The Applicant has also observed that the green or partially vulcanised decorative element could be easily brought into contact with the sidewall of the green tyre during the moulding and vulcanisation process, and subsequently co-vulcanised together with the tyre in conventional moulds used for tyre vulcanisation, thus avoiding further processing after the vulcanisation required for the application of decorative elements on finished tyres.

During the experimentation, the Applicant has also observed that the decorative element could be further printed with a thin layer of rubber-based inks capable in turn of co-vulcanising during the moulding and vulcanisation process and of having a good resistance to abrasion and impact during use of the tyre.

Further advantages which have appeared to the Applicant consist in the rubbery behaviour of the decorative element which allows withstanding the deformations experienced after the manufacture of the tyre and, in particular, at the time of the inflation and subsequent use thereof under a vehicle, the absence of substantial defects during the application of the elastomeric composition of the decorative element on the tyre sidewall, the absence of substantial ageing phenomena (i.e. cracking, discoloration or other surface defects) due to exposure to air, ozone and/or to high temperatures, and chemical resistance which makes it easy to clean and restore the initial color in the event of contamination resulting from the use of the tyre (for example, residues of grease, mud or other materials).

Therefore, a first aspect of the present invention relates to a tyre comprising:
  a carcass structure comprising at least a carcass ply having opposite lateral edges associated to respective bead structures;
  a tread band applied in a radially outer position to said carcass structure;
  a pair of sidewalls applied laterally on opposite sides with respect to said carcass structure; and
  at least one colored decorative element having a thickness equal to or greater than 200 µm applied on at least one side of said pair of sidewalls,
  where said pair of sidewalls comprises an elastomeric composition comprising (i) at least one diene elastomeric polymer, and (ii) an ozone protection system, and said at least one decorative element is made of a cross-linkable elastomeric composition comprising:
  (i) 100 phr of elastomeric polymer comprising from 30 to 70 phr of natural and/or synthetic isoprene rubber, and from 30 to 70 phr of a rubber selected from the group consisting of butyl rubber, halobutyl rubber, butadiene rubber, styrene-butadiene rubber, and mixtures thereof,
  (ii) from 5 to 120 phr of at least one reinforcement filler,
  (iii) optionally at least 0.5 phr of at least one coloring agent, and
  (iv) optionally, a non-staining ozone protection system,
  said at least one decorative element being directly applied green or partially vulcanised to said at least one sidewall of said pair of sidewalls of the green tyre, and co-vulcanised with said green tyre.

Preferably, said pair of sidewalls comprises an elastomeric composition comprising at least one diene elastomeric polymer and the non-staining ozone protection system.

According to another aspect, the present invention relates to a colored decorative element comprising at least one layer of cross-linkable elastomeric composition arranged on a plastic support, where said elastomeric composition comprises:
  (i) 100 phr of elastomeric polymer comprising from 30 to 70 phr of natural and/or synthetic isoprene rubber, and from 30 to 70 phr of a rubber selected from the group consisting of butyl rubber, halobutyl rubber, butadiene rubber, styrene-butadiene rubber, and mixtures thereof,
  (ii) from 5 to 120 phr of at least one reinforcement filler,
  (iii) optionally at least 0.5 phr of at least one coloring agent, and
  (iv) optionally, a non-staining ozone protection system.

According to another aspect, the present invention relates to a process for making a tyre comprising:
  building a green tyre,
  introducing the green tyre into a tyre vulcanisation apparatus,
  depositing at least one layer of cross-linkable elastomeric composition on a plastic support,
  optionally, partially pre-vulcanising said at least one layer and shaping said at least one layer to remove part of it,
  applying said at least one layer on the mould sidewall of said vulcanisation device corresponding to the sidewall of the green tyre,
  closing said tyre vulcanisation apparatus bringing into contact said at least one layer with said sidewall, and co-vulcanising said green tyre and said layer.

DETAILED DESCRIPTION OF THE INVENTION

For the purposes of the present description and of the following claims, unless indicated otherwise, all the numbers expressing quantities, values, percentages and so on must be interpreted as modified in all cases by the term "about". Furthermore, all ranges include any combination of the maximum and minimum points described and include any intermediate range, which may or may not have been specifically listed herein.

By the expression "rubber", "elastomeric polymer" or "elastomer" it is meant a natural or synthetic polymer which, after vulcanisation, at room temperature can be stretched repeatedly to at least twice its original length and which, after removal of the tensile load substantially immediately returns with force to approximately its original length (according to the definitions of the ASTM D1566-11 Standard terminology relating to Rubber).

The term "non-staining ozone protection system" means a system of protection against ozone substantially free of staining agents, typically represented by antioxidants, antiozonants, and possibly free of waxes and/or other static polymeric protective agents.

The amounts of the various components of an elastomeric composition are generally provided in phr, where the term phr means component parts per every hundred rubber parts minus any extension oils.

For the purposes of the present description and for the following appended claims, the expression "substantially free" indicates the absence or a quantity comprised between 0 phr and 0.1 phr.

For the purposes of the present description and for the following appended claims, the expression "directly applied" means that an element, for example the decorative layer, is applied to another element, for example the sidewall of the tyre, without interposition of any intermediate layer or element.

According to a preferred embodiment, the elastomeric composition used to make the sidewall of the tyre comprises for 100 phr of said elastomeric composition:
- ($a_1$) at least one polyisoprene rubber in an amount greater than or equal to 20 phr, preferably from 30 phr to 90 phr, and
- ($a_2$) at least one diene elastomeric polymer other than polyisoprene rubber ($a_1$) in an amount of less than or equal to 80 phr, preferably from 10 phr to 70 phr.

According to a preferred embodiment, the polyisoprene rubber ($a_1$) may be selected from natural and/or synthetic polyisoprene rubber, preferably from natural and/or synthetic cis-1-4-polyisoprene rubber, synthetic 3,4-polyisoprene rubber, more preferably from natural cis-1,4-polyisoprene rubber (natural rubber). Preferably, said natural rubber is present in the above cross-linkable elastomeric composition in an amount of from 30 phr to 60 phr, more preferably from 30 phr to 50 phr.

According to a preferred embodiment, the diene elastomeric polymer ($a_2$) other than polyisoprene rubber ($a_1$) can be selected from among those commonly used in elastomeric compositions cross-linkable with sulphur, which are particularly suitable for the production of tyres, or from elastomeric polymers or copolymers having an unsaturated chain having a glass transition temperature ($T_g$) generally below 20° C., preferably within the range of –0° C. to –110° C. These polymers or copolymers can be of natural origin or can be obtained by polymerisation in solution, polymerisation in emulsion or polymerisation in gas phase of one or more conjugated diolefins, optionally mixed with at least one comonomer selected from polar monovinylarenes and/or comonomers in an amount not exceeding 60% by weight.

Conjugated diolefins generally contain from 4 to 12, preferably from 4 to 8 carbon atoms and may be selected, for example, from the group comprising: 1,3-butadiene, 2,3-dimethyl-1,3-butadiene, 1,3-pentadiene, 1,3-hexadiene, 3-butyl-1,3-octadiene, 2-phenyl-1,3-butadiene or mixtures thereof. 1,3-butadiene is particularly preferred.

The monovinylarenes that can be optionally used as comonomers generally contain from 8 to 20, preferably from 8 to 12 carbon atoms and can be selected, for example, from: styrene: 1-vinylnaphthalene; 2-vinylnaphthalene; various alkyl, cycloalkyl, aryl, alkylaryl or arylalkyl derivatives of styrene such as α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, or mixtures thereof. Styrene is particularly preferred.

Polar comonomers that may optionally be used can be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile or mixtures thereof.

Preferably, the diene elastomeric polymer ($a_2$) can be selected, for example, from: polybutadiene (in particular polybutadiene with a high content 1,4-cis), optionally halogenated isoprene/isobutene copolymers, 1,3-butadiene/acrylonitrile copolymers, styrene/1,3-butadiene copolymers (SBR), styrene/isoprene/1,3-butadiene copolymers, styrene/1,3-butadiene/acrylonitrile copolymers, or mixtures thereof. Polybutadiene (in particular, polybutadiene with a high content 1,4-cis, usually above 90%, and a low vinyl content, usually below 5%) or mixtures thereof are particularly preferred. Preferably, said polybutadiene is present in the above cross-linkable elastomeric composition in an amount of from 40 phr to 70 phr, more preferably from 50 phr to 70 phr.

The above cross-linkable elastomeric composition can optionally comprise at least one elastomeric polymer of one or more monoolefins with an olefinic comonomer or derivatives thereof. Monoolefins can be selected from: ethylene and α-olefins generally containing 3 to 12 carbon atoms, such as for example propylene, 1-butene, 1-pentene, 1-hexene, 1-octene or mixtures thereof. The following are preferred: copolymers selected from ethylene and an α-olefin, optionally with a diene; isobutene homopolymers or copolymers thereof with small amounts of a diene, which are optionally at least partially halogenated. The diene optionally present generally contains 4 to 20 carbon atoms and is preferably selected from: 1,3-butadiene, isoprene, chloroprene, neoprene, 1,4-hexadiene, 1,4-cyclohexadiene, 5-ethylidene-2-norbornene, 5-methylene-2-norbornene, vinylnorbornene or mixtures thereof. Among them, the following are particularly preferred: ethylene/propylene (EPR) copolymers or ethylene/propylene/diene (EPDM) copolymers; polyisobutene; butyl rubber; halobutyl rubbers, in particular chlorobutyl or bromobutyl rubbers; or mixtures thereof.

The above cross-linkable elastomeric composition can optionally comprise at least a polyisoprene rubber ($a_1$) and/or at least one diene elastomeric polymer ($a_2$) functionalised by reaction with suitable terminating agents or coupling agents. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, imines, carbodiimides, alkyltin halides, substituted benzophenones, alkoxysilanes or aryloxysilanes (see, for example, European patent EP 451 604 or U.S. Pat. Nos. 4,742,124 and 4,550,142).

At least one reinforcement filler may be advantageously added to the above cross-linkable elastomeric composition above, generally in an amount of from 0 phr to 120 phr, preferably from 20 phr to 90 phr. The reinforcement filler may be selected from those commonly used for cross-linked manufactured articles, in particular for tyres, such as carbon black, silica, alumina, aluminosilicates, calcium carbonate, kaolin or mixtures thereof. Carbon black, silica and mixtures thereof are particularly preferred.

According to a preferred embodiment, said carbon black reinforcement filler can be selected from those having a surface area of not less than 20 m$^2$/g (as determined by Statistical Thickness Surface Area—STSA—according to ISO 18852:2005).

Silica, which can be used in the present invention, may be generally a fumed silica or preferably a precipitated silica, with a surface area BET (as measured according to the ISO 5794/1 standard) of from 50 m$^2$/g to 500 m$^2$/g, preferably from 70 m$^2$/g to 200 m$^2$/g.

When a reinforcement filler comprising silica is present, the cross-linkable elastomeric composition may advantageously incorporate a silane coupling agent able to interact with silica and link it to the elastomeric polymer during the vulcanisation.

The coupling agents that are used preferably are silane-based ones that can be identified, for example, by the following structural formula (I):

wherein the $R_2$ groups, which can be equal or different from each other, are selected from: alkyl, alkoxy or aryloxy groups or halogen atoms, with the proviso that at least one of the $R_2$ groups is an alkoxy or an aryloxy group; t is an integer of between 1 and 6 inclusive; X is a group selected from: nitrose, mercapto, amino, epoxide, vinyl, imide, chlorine, —(S)$_u$C$_t$H$_{2t}$—Si—(R$_2$)$_3$ or —S—COR$_2$, wherein u and t are integers of between 1 and 6, ends included and the R$_2$ groups are as defined above.

Among the coupling agents, bis(3-triethoxysilylpropyl) tetrasulphide and bis(3-triethoxysilylpropyl)disulphide are particularly preferred. Said coupling agents may be used as such or as suitable mixtures with an inert filler (such as carbon black) so as to facilitate their incorporation into the cross-linkable elastomeric composition.

According to a preferred embodiment, said silane coupling agent is present in the elastomeric composition in an amount ranging between 0.01 phr and about 10 phr, preferably between about 0.5 phr and about 5 phr.

According to a preferred embodiment, the non-staining ozone protection system is substantially free of antioxidants and/or anti-ozonants based on aromatic amines, such as for example N-(1,3-dimethylbutyl)-N'-phenyl-p-phenylenediamine (DMBPPD), N-phenyl-N'-isopropyl-p-phenylenediamine (IPPD), or N-(1,3-dimethylbutyl)-N'-phenyl-phenylenediamine (6PPD).

Preferably, in particular when used in elastomeric compositions without white reinforcement fillers, the non-staining ozone protection system is also substantially free of (i) waxes, such as petroleum wax, and/or (ii) other static polymeric protection, such as, for example, polyethylene glycol and (meth)acrylic copolymers.

Advantageously, the non-staining ozone protection system substantially consists of at least one phenolic antioxidant in an amount equal to or greater than 3 phr, preferably equal to or greater than 4 phr, and/or at least one cyclic acetal or enol-ether antioxidant, in an amount equal to or greater than 1 phr, preferably equal to or greater than 2 phr.

Useful examples of usable phenolic antioxidants are pentaerythrityl tetrakis[3-(3,5-di-t-butyl-4-hydroxyphenyl)propionate] distributed by BASF as IRGANOX 1010; 2,2-thiodiethylene bis-[(3-(3,5-di-t-butyl-4-hydroxyphenyl) propionate)] distributed by BASF as IRGANOX 1035; octadecyl-3-(3,5-di-t-butyl-4-hydroxyphenyl)propionate distributed by BASF as IRGANOX 1076; isooctyl-3-(3,5-di-t-butyl-4-hydroxyphenyl)propionate distributed by BASF as IRGANOX 1135; 1,3,5-trimethyl-2,4,6-tris(3,5-di-t-butyl-4-hydroxybenzyl)benzene distributed by BASF as IRGANOX 1330; 4,6-bis(dodecylthiomethyl)-o-cresol distributed by BASF as IRGANOX 1726; 4,6-bis(octytiomethyl)-o-cresol distributed by BASF as IRGANOX 1520; triethyleneglycol-bis[(3-(3-t-butyl-5-methyl-4-hydroxyphenyl)propionate)] distributed by BASF as IRGANOX 245; 1,6-hexanediol-bis[(3-(3,5-di-t-butyl-4-hydroxyphenyl)propionate] distributed by BASF as IRGANOX 259; 4-{[4,6-bis(octylsulphanyl)-1,3,5-triazin-2-yl]amino]-2,6-di-t-butylphenol distributed by BASF as IRGANOX 565.

Preferably, said phenolic antioxidant is selected from the group consisting of 4,6-bis(octyltiomethyl)-o-cresol distributed by BASF as IRGANOX 1520 and 4-{([4,6-bis(octylsulphanyl)-1,3,5-triazin-2-yl] amino}-2,6-di-t-butylphenol distributed by BASF as IRGANOX 565.

Useful examples of cycloacetal or enol-ether antioxidants are 3,9-di-3-cyclohexen-1-yl-2,4,6,10-tetraoxaspyro[5.5] undecane distributed by Lanxess as Vulkazon AFS/LG, and cyclohexen-3-ylidenmethyl-benzylether distributed by Lanxess as Vulkazon AFD.

The decorative element according to the present invention is made with a cross-linkable elastomeric composition comprising, (i) 100 phr of elastomeric polymer comprising from 30 to 70 phr of natural and/or synthetic isoprene rubber, and 30 to 70 phr of a rubber selected from the group consisting of butyl rubber, halobutyl rubber, butadiene rubber, styrene-butadiene rubber, and mixtures thereof, (ii) from 5 to 120 phr of at least one reinforcement filler, (iii) optionally, at least 0.5 phr of at least one coloring agent, and (iv) optionally, a non-staining ozone protection system.

In an embodiment according to the invention, the decorative element is made with a cross-linkable elastomeric composition comprising 100 phr of elastomeric polymer consisting of from 30 to 70 phr of natural and/or synthetic isoprene rubber, and from 30 to 70 phr of a rubber selected from the group consisting of butyl rubber, halobutyl rubber, butadiene rubber, styrene-butadiene rubber, and mixtures thereof.

The decorative element has a thickness equal to or greater than 200 μm (micrometres), preferably equal to or greater than 250 μm, even more preferably equal to or greater than 300 μm.

Preferably, the decorative element has a thickness equal to or less than 800 μm, more preferably equal to or less than 600 μm, even more preferably equal to or less than 500 μm.

According to a preferred aspect of the present invention, the decorative element is made with a cross-linkable elastomeric composition comprising 100 phr of elastomeric polymer comprising from 30 to 70 phr of natural and/or synthetic isoprene rubber, and from 30 to 70 phr of butyl or halobutyl rubber, or from 30 to 70 phr of butadiene or styrene-butadiene rubber, or 30 to 70 phr of mixtures thereof.

Preferably, said natural and/or synthetic isoprene rubber is present in the cross-linkable elastomeric composition in an amount of from 40 phr to 60 phr, more preferably in an amount of about 50 phr.

Advantageously, said cross-linkable elastomeric composition comprises butyl or halobutyl rubber in an amount of from 40 phr to 60 phr, more preferably in an amount of about 50 phr.

Preferably, said cross-linkable elastomeric composition comprises butadiene and/or styrene-butadiene rubber in an amount of from 40 phr to 60 phr, more preferably in an amount of about 50 phr.

Alternatively, said cross-linkable elastomeric composition comprises from 40 phr to 60 phr, more preferably about 50 phr of a mixture of butyl or halobutyl rubber and butadiene and/or styrene-butadiene rubber. Butyl rubber is a rubber obtained by cationic polymerisation of isobutylene with percentages of 2-7% of isoprene.

Halobutyl rubber is a halogenated butyl rubber. Halogen is present following the post-treatment of butyl rubber by reaction to chlorine or bromine with butyl rubber according to methods known in the art. As is known in the art, butyl rubber is a copolymer of about 95.5-99.5% molar of isobutylene and 0.5-4.5% molar of isoprene. Halobutyl rubber comprises chlorobutyl rubber, bromobutyl rubber or mixtures thereof. Butadiene rubber is a synthetic rubber obtained by polymerisation of 1,3-butadiene.

Styrene-butadiene rubber is a copolymer of styrene and 1,3-butadiene. The amount of styrene (the ratio between the weight of the styrene units and that of the total monomer units) in the styrene-butadiene rubber is not particularly limited, but is preferably equal to or greater than 5% by weight, more preferably equal to or greater than 10% by weight, in particular equal to or greater than 15% by weight. Moreover, the amount of styrene is preferably equal to or less than 50% by weight equal to or less than, more preferably equal to or less than 45% by weight, in particular equal to or less than 30% by weight. The vinyl bond content of the butadiene monomer units contained in the styrene-butadiene rubber is preferably equal to or greater than 30% by weight, more preferably equal to or greater than 35% by weight, in particular equal to or greater than 40% by weight. Furthermore, the vinyl bond content is preferably equal to or less than 90% by weight equal to or less than, more preferably equal to or less than 80% by weight, in particular equal to or less than 70% by weight.

The decorative element is made with a cross-linkable elastomeric composition comprising 100 phr of elastomeric polymer, from 5 to 120 phr, preferably from 30 to 120 phr, more preferably from 60 to 120 phr of at least one reinforcement filler.

The reinforcement filler may be selected from those commonly used for cross-linked manufactured articles, in particular for tyres, such as carbon black, silica, titanium dioxide, alumina, aluminosilicates, calcium carbonate, kaolin, talc, chalk or mixtures thereof.

Light reinforcement fillers are preferred for making white and/or colored decorative elements. Typically, the light reinforcement filler may be selected from: silica, alumina, titanium dioxide, aluminosilicates, bentonite, calcium carbonate, kaolin, talc, barite (barium sulphate), chalk or mixtures thereof. Silica, titanium dioxide, kaolin, barium sulphate and mixtures thereof are particularly preferred light reinforcement fillers.

In particular, the light reinforcement filler may comprise up to 60 phr of silica, up to 40 phr of kaolin, and up to 60 phr of titanium dioxide. When present, the silica is preferably between 1 and 60 phr, more preferably between 5 and 50 phr. If present, the kaolin is preferably between 1 and 40 phr, more preferably between 5 and 35 phr. If present, titanium dioxide is preferably between 1 and 60 phr, more preferably between 5 and 50 phr.

In particular, titanium dioxide may be used both as a reinforcement filler and as a coloring agent to impart saturation and/or white color.

Dark reinforcement fillers, typically carbon black, may be added to the elastomeric composition of the decorative element to impart other properties to said composition, as long as the color of the filler does not negatively modify or change the desired color of the colored composition. The presence of carbon black in a very low percentage, i.e. a few phr, such as for example 1-5 phr, allows obtaining a color with a darker appearance, in particular with the red, blue and green pigments.

The dark reinforcement fillers, typically carbon black, are preferred for making black decorative elements, having the function of protection barrier and support for printing rubber-based ink layers capable of co-vulcanising with the decorative element during the moulding and vulcanisation process. Rubber-based inks are known in the art and typically comprise a dye or pigment dispersed in a polymeric base comprising natural and/or synthetic rubber, butadiene rubber, styrene-butadiene rubber, butyl rubber, halobutyl rubber, and mixtures thereof. Rubber-based inks can be printed by means of printing techniques known in the art, such as, for example, screen printing, digital printing, flexographic printing, and/or pad printing.

The rubber-based ink layer has a thickness equal to or greater than 5 μm (micrometres), preferably equal to or greater than 10 μm, even more preferably equal to or greater than 15 μm.

Preferably, the rubber-based ink layer has a thickness equal to or less than 50 μm, even more preferably equal to or less than 40 μm, even more preferably equal to or less than 30 μm.

By way of example, a composition of yellow ink (dry fraction) which is used after dissolution in organic solvent (mixture of aromatic hydrocarbons) is described:

| Ingredient | phr |
|---|---|
| NR (or IR) | 50 |
| Styrene-butadiene rubber | 30 |
| BR | 20 |
| $TiO_2$ | 50 |
| $BaSO_4$ | 50 |
| ZnO | 5 |
| Stearic acid | 2 |
| Plasticiser/compatibiliser | 5 |
| Non-staining antioxidant | 3 |
| Thiazolic accelerant | 2 |
| Ultra-accelerant | 4 |
| Organic pigment | 20 |

Styrene-butadiene rubber: SBR 1502 = ESBR non-extended oil (23.5% Styrene)
BR: Neocis BR40 by Versalis
Plasticiser/compatibiliser: wax, paraffinic oil
Ultra-accelerant: Rhenogran ZBEC 70: Zinc dibenzyldithiocarbarnate (70%) by Rheinchemie
Thiazolic accelerant: Rhenogran MBTS 80 by Rheinchemie
Non-staining antioxidant: LOWINOX CPL: reaction product of t-butyl p-cresol and dicyclopentadiene by Addivant
Organic pigment: SUDAPERM YELLOW 2923 by SUDARSHAN By way of example, an elastomeric layer composition is described on which the rubbery ink layer can be deposited to make a two-layer decorative element.

| Ingredient | phr |
|---|---|
| NR (or IR) | 70 |
| Styrene-butadiene rubber | 30 |
| Carbon black | 10 |
| Talc | 50 |
| Stearic acid | 2 |
| Zn Oxide | 3 |
| Non-staining antioxidant | 1.5 |
| Wax | 1 |
| Secondary accelerant | 2.5 |
| Primary accelerant | 1 |
| Sulphur donor | 4 |

Styrene-butadiene rubber: SBR 1502 = ESBR non-extended oil (23.5% Styrene)
Carbon black: N550 by Columbian Trecate
Non-staining antioxidant: LOWINOX CPL: reaction product of t-butyl p-cresol and dicyclopentadiene by Addivant
Talc: Mistron Vapor by IMERYS
Primary accelerant: CBS by Huathai
Secondary accelerant: Rhenogran MBTS 80 Supplier RHEINCHEMIE
Sulphur donor: Rhenogran CLD80 supplier Rheinchemie Optionally, the decorative element is made with a cross-linkable elastomeric composition comprising, for 100 phr of elastomeric polymer, at least 0.5 phr of at least one coloring agent, preferably at least 1 phr, even more preferably at least 5 phr.

Preferably, the decorative element is made with a cross-linkable elastomeric composition comprising, for 100 phr of elastomeric polymer an amount lower than or equal to 100 phr of at least one coloring agent, more preferably lower than or equal to 80 phr, even more preferably lower than or equal to 60 phr, for example between 10 and 50 phr.

According to a preferred embodiment, said coloring agent may be selected from: titanium dioxide, zinc oxide, iron oxides, metals such as powdered aluminium or copper, metal pastes such as aluminium pastes, pigments comprising organic components, pigments comprising inorganic components, pigments comprising fluorescent components, pigments comprising luminescent components, pigments absorbing ultraviolet rays, pigments comprising mineral components, oxides of amorphous glass, polyacrylates, metallic flakes, reflecting pigments, or mixtures thereof.

The selection of the coloring agent and the amount thereof vary depending on the choice of color and the intensity of the color to be imparted to the surface to be coated.

Examples of coloring agents which may be used according to the present invention and which are available on the market are the Offset® FM/4500 (aluminium paste) products from Schlenk, or Hostaperm Blue® BT-617-D (blue pigment), Hostaperm Green GG 01 (green pigment), Hostaperm Orange GR (orange pigment), Hostaperm Red E2B 70 (red pigment), Hostaperm Yellow H3G (yellow pigment) from Clariant.

The decorative element may be made in the form of printing by means of rubber-based inks on an element in an elastomeric mixture, for example black, or it may be made as a rubber-based ink layer deposited on a layer of elastomeric mixture and subsequent die-cutting or made in a bulk colored elastomeric composition.

The decorative element is made on or coupled with a support preferably made of plastic material, for example made of polyethylene terephthalate or polyamide as described above with the colored portion or layer in contact with the support.

The assembly of decorative element and support may be applied on the sidewall of a green tyre, and vulcanised together with the tyre, or it may be applied on the sidewall of a finished tyre, and subsequently vulcanised.

Advantageously, the assembly of decorative element and support is applied on the sidewall of a green tyre, and vulcanised together with the tyre.

The elastomeric compositions described above (both that of the decorative element and those of the sidewall and of the other components of the tyre) may be vulcanised according to known techniques, in particular with sulphur-based vulcanisation systems, commonly used for elastomeric polymers. To this end, after one or more thermo-mechanical treatment steps, a sulphur-based vulcanising agent is incorporated in the elastomeric composition, together with vulcanisation accelerants. In the final step of the treatment, the temperature is generally kept below 140° C., so as to avoid any unwanted pre-crosslinking phenomenon.

The vulcanising agent most advantageously used is sulphur, or sulphur-containing molecules (sulphur donors), with accelerants and activators known by the man skilled in the art.

The activators that are particularly effective are zinc-based compounds, and in particular ZnO, $ZnCO_3$, zinc salts of saturated or unsaturated fatty acids containing from 8 to 18 carbon atoms, such as, for example, zinc stearate, which are preferably formed in situ in the elastomeric composition starting from ZnO and fatty acid, as well as $Bi_2O_3$, PbO, $Pb_3O_4$, $PbO_2$ or mixtures thereof.

The accelerants that are commonly used may be selected from: dithiocarbamates, guanidine, thiourea, thiazoles, sulphonamides, thiurams, amines, xanthates or mixtures thereof.

The elastomeric compositions used may include other additives commonly selected on the basis of the specific application for which each composition is intended. For example, the following additives may be added to said elastomeric compositions: antioxidants, anti-aging agents, plasticizers, adhesives, antiozonants, modifying resins, fibres (aramid or of natural origin), or mixtures thereof.

Preferably, the elastomeric compositions used for the decorative element comprise a non-staining ozone protection system substantially free of antioxidants and/or antiozonants based on aromatic amines, such as for example N-(1,3-dimethylbutyl)-N'-phenyl-p-phenylenediamine (DMBPPD), N-phenyl-N'-isopropyl-p-phenylenediamine (IPPD), or N-(1,3-dimethylbutyl)-N'-phenyl-phenylenediamine (6PPD). Preferably, in particular when used in elastomeric compositions without white reinforcement fillers, the non-staining ozone protection system is also substantially free of (i) waxes, such as petroleum wax, and/or (ii) other static polymeric protection, such as, for example, polyethylene glycol and (meth)acrylic copolymers.

Advantageously, the non-staining ozone protection system optionally used for the decorative element substantially consists of at least one phenolic antioxidant in an amount equal to or greater than 3 phr, preferably equal to or greater than 4 phr, optionally in combination with at least one cyclic acetal or enol-ether antioxidant, in an amount equal to or greater than 1 phr, preferably equal to or greater than 2 phr, as described in the international patent application no. PCT/IB2018/051388.

Useful examples of phenolic antioxidants which can be used are the same as those described above with reference to the elastomeric composition for the sidewalls.

The elastomeric compositions used for making the sidewall and the decorative element do not contain the staining agents present in the elastomeric compositions used in the manufacture of the other components of the tyre, typically represented by antioxidants, antiozonants, waxes, and other polymeric static protections or contain an amount thereof of less than 0.1 phr. However, amounts greater than 0.1 phr of such staining agents may be present in the sidewall and more rarely in the decorative element of the tyre of the present invention by virtue of the partial migration of such staining agents from the inner elements of the tyre.

The present invention will now be described hereinafter with reference to the accompanying drawings, provided only for illustrative and, therefore, non-limiting purposes, in which.

DETAILED DESCRIPTION OF EMBODIMENTS OF THE INVENTION

Figure 1:
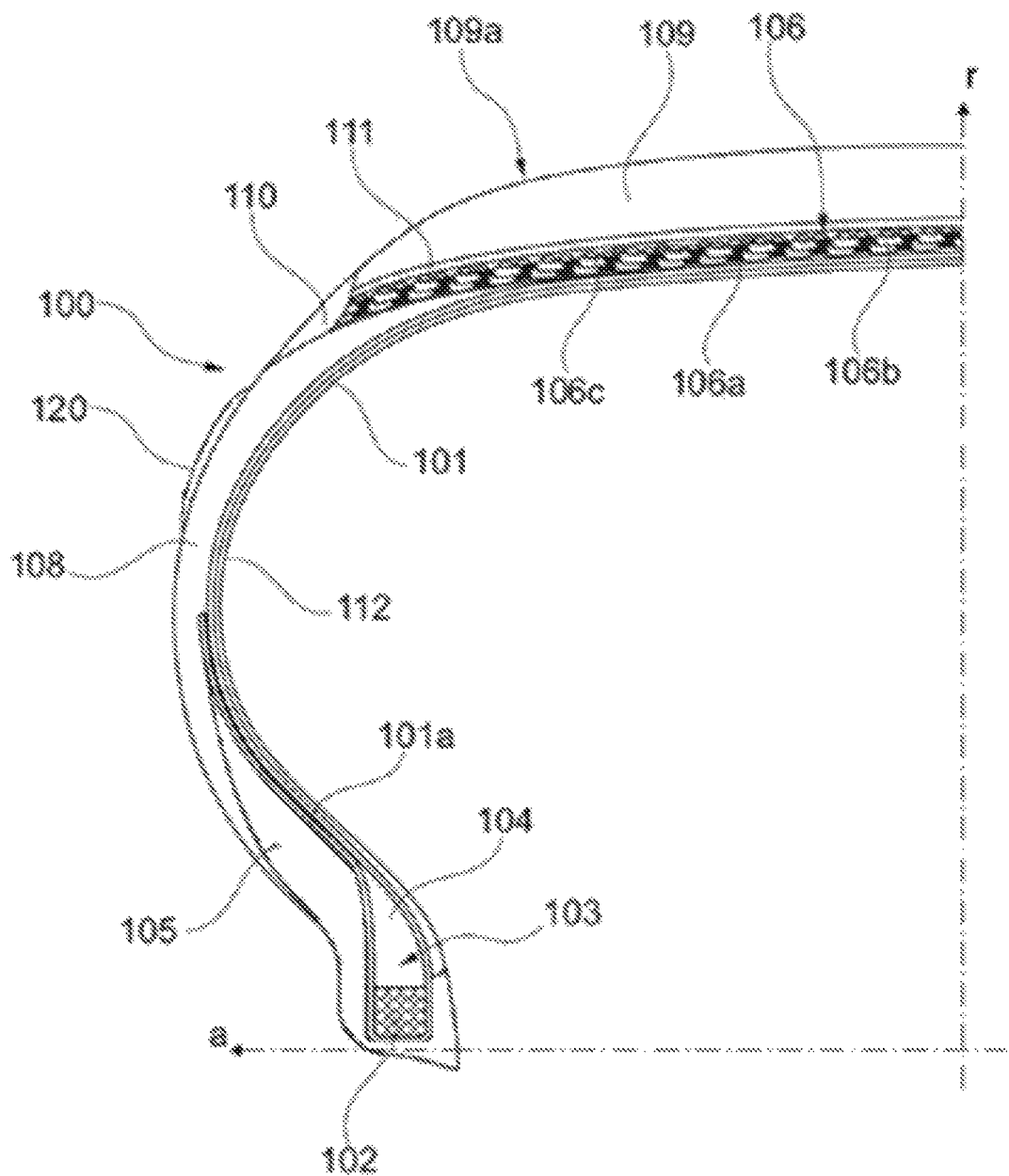
FIG. 1 shows a cross half-section showing a tyre for motor vehicle wheels according to an embodiment of the present invention.

FIG. 1 shows a tyre 100 having a sidewall 108 on which a colored decorative element 120 (meaning also white as colored) made according to the present invention is present.

In FIG. 1, the decorative element 120 may cover only a part of the sidewall 108 of the tyre, as for example in the case in which the decorative element 120 comprises drawings, letters, logos, marks, decals applied on the sidewall of the tyre, or it may cover almost the whole sidewall 108, as for example in the case in which said decorative element 120 comprises a layer arranged, in whole or in part, along the circular section of the sidewall 108.

In FIG. 1, "a" indicates an axial direction and "r" indicates a radial direction.

With reference to FIG. 1, the tyre 100 for motor vehicle wheels comprises at least one carcass structure, comprising at least one carcass layer 101 having respectively opposite end flaps engaged with respective annular anchoring structures 102, referred to as bead cores, possibly associated to a bead filler 104. The tyre area comprising the bead core 102 and the bead filler 104 forms a reinforcement annular structure 103, the so-called bead, intended for anchoring the tyre onto a corresponding mounting rim, not shown.

The carcass structure is usually of radial type, i.e. the mutually parallel reinforcement elements of the at least one carcass layer 101 lie on planes comprising the rotational axis of the tyre and substantially perpendicular to the equatorial plane of the tyre.

Alternatively, tyres are made (not shown) provided with cross-ply carcass structures.

In such tyres, the carcass structure may comprise at least a first and a second radially overlapping carcass ply, each made of elastomeric material and comprising a plurality of mutually reinforcement elements arranged parallel to one another.

The carcass plies are radially overlapped so that the reinforcement elements of a ply are inclined with respect to the reinforcement elements of the radially overlapped carcass ply and to the equatorial plane.

In the carcass ply/plies (both in radial tyres and in cross-ply carcass tyres), the reinforcement elements may consist of metal and/or textile cords, for example steel in the case of metal or rayon cords, lyocell, nylon, polyester [e.g. polyethylene naphthalate (PEN)] in the case of textile cords. Each reinforcement annular structure is associated to the carcass structure by folding back of the opposite lateral edges of the at least one carcass layer 101 around the annular anchoring structure 102 so as to form the so-called carcass flaps 101a as shown in FIG. 1.

In one embodiment, the coupling between the carcass structure and the reinforcement annular structure can be provided by a second carcass layer (not shown in FIG. 1) applied in an axially outer position with respect to the first carcass layer.

An anti-abrasive strip 105 is arranged in an outer position of each reinforcement annular structure 103. Preferably each anti-abrasive strip 105 is arranged at least in an axially outer position to the reinforcement annular structure 103 extending at least between the sidewall 108 and the portion radially below the reinforcement annular structure 103.

Advantageously, the anti-abrasive strip 105 is preferably made with the same elastomeric composition used to make the sidewalls 108 according to the present invention, i.e. a cross-linkable elastomeric composition comprising (i) at least one diene elastomeric polymer, and (ii) a non-staining ozone protection system.

Preferably, the anti-abrasive strip 105 is arranged so as to enclose the reinforcement annular structure 103 along the axially inner and outer and radially lower areas of the reinforcement annular structure 103 so as to interpose between the latter and the wheel rim when the tyre 100 is mounted to the rim.

In radial tyres, the carcass structure is associated to a belt structure 106 comprising one or more belt layers 106a, 106b placed in radial superposition with respect to one another and with respect to the carcass layer, having typically metallic reinforcement cords. Such reinforcement cords may have crossed orientation with respect to a direction of circumferential development of tyre 100. By "circumferential" direction it is meant a direction generally facing in the direction of rotation of the tyre.

At least one zero-degree reinforcement layer 106c, commonly known as a "0° belt", may be applied in a radially outermost position to the belt layers 106a, 106b, which generally incorporates a plurality of reinforcement cords, typically textile cords, oriented in a substantially circumferential direction, thus forming an angle of a few degrees (such as an angle of between about 0° and 6°) with respect to the equatorial plane of the tyre, and coated with an elastomeric material.

A tread band 109 of elastomeric blend is applied in a position radially outer to the belt structure 106.

In some embodiments (for example tyres for motorcycle or scooter wheels), the belt structure may be absent.

In a radially outer position, the tread band 109 has a rolling surface 109a intended to come in contact with the ground. Circumferential grooves, which are connected by transverse notches (not shown in FIG. 1) so as to define a plurality of blocks of various shapes and sizes distributed over the rolling surface 109a, are generally made on this surface 109a, which for simplicity is represented smooth in FIG. 1.

An under-layer 111 is arranged between the belt structure 106 and the tread band 109.

In the case of tubeless tyres, a rubber layer 112, generally known as "liner", which provides the necessary air-tightness to the inflation air of the tyre, can also be provided in a radially inner position with respect to the carcass layer 101.

Moreover, respective sidewalls 108, made with a cross-linkable elastomeric composition comprising (i) at least one diene elastomeric polymer, and (ii) a non-staining ozone protection system, are further applied on the lateral surfaces of the carcass structure, each extending from one of the lateral edges of the tread 109 at the respective reinforcement annular structure 103.

A strip consisting of elastomeric material 110, commonly known as "mini-sidewall", can optionally be provided in the connecting zone between the sidewalls 108 and the tread band 109, this mini-sidewall being generally obtained by co-extrusion with the tread band 109 and allowing an improvement of the mechanical interaction between the tread band 109 and the sidewalls 108. Preferably, the end portion of sidewall 108 directly covers the lateral edge of the tread band 109.

Preferably, if present, the mini-sidewall 110 is made like the sidewall with a cross-linkable elastomeric composition comprising (i) at least one diene elastomeric polymer, and (ii) a non-staining ozone protection system.

On the outer surface of at least one of the two sidewalls 108 (as shown in FIG. 1) at least one decorative element 120 made according to the present invention is applied by co-vulcanisation.

The building of the tyre 100 according to the present invention may be carried out according to the techniques and using the apparatuses that are known in the art, said building including the manufacture of the green tyre, the manufacture of the green decorative element, the moulding, the vulcanisation of the green tyre and of the green decorative element.

The application of the green or partially vulcanised decorative element may take place on the green tyre (and in this case the vulcanisation of the decorative element 120 will be simultaneous with that of the tyre 100) or on the finished tyre (and in this case the vulcanisation of the green decorative element will be subsequent to that of the green tyre).

For the purposes of the present invention, the application of the green or partially vulcanised decorative element takes place on the green tyre.

In particular, the building of the tyres 100 as described above may be carried out by assembling respective semi-finished products onto a forming drum, not shown, by at least one assembly device.

At least a part of the components intended to form the carcass structure of the tyre may be built and/or assembled on the forming drum. More particularly, the forming drum is intended to first receive the possible liner, then the carcass structure. Subsequently, devices not shown coaxially engage one of the annular anchoring structures around each of the terminal flaps, and subsequently the sidewalls and the anti-abrasive strip are positioned.

Thereafter, an outer sleeve comprising the belt structure and the tread band may be positioned in a coaxially centred position around the cylindrical carcass sleeve and shape the carcass sleeve according to a toroidal configuration through a radial expansion of the carcass structure, so as to cause the application thereof against a radially inner surface of the outer sleeve.

After the building of the green tyre, a moulding and vulcanisation treatment is generally carried out in order to determine the structural stabilisation of the tyre through cross-linking of the elastomeric blends, as well as to impart a desired tread pattern on the tread band and to impart any distinguishing graphic signs at the sidewalls.

The moulding and vulcanisation treatment is carried out in a vulcanisation apparatus known in the art comprising a toroidal support designed to engage a tyre being processed, a vulcanisation mould designed to receive the toroidal support, pressing means for pressing the outer surface of the tyre against the walls of the moulding cavity comprising a sidewall intended to form the surfaces of the sidewalls and a crown of sectors designed to form the surface of the tread; and heating means for transmitting heat to the tyre closed between the moulding cavity and the toroidal support. The decorative element 120 may be placed directly on the forming drum before assembling the sidewalls, it may be positioned on the green tyre before moulding and vulcanisation, or it may be positioned on the sidewall of the vulcanisation apparatus, and brought into contact with the sidewall of the green tyre during vulcanisation.

Advantageously, the decorative element 120 coupled with a support layer is positioned on the sidewall of the vulcanisation apparatus, and brought into contact with the sidewall of the green tyre during vulcanisation.

The Applicant has observed that the application of the decorative element 120 during the moulding and vulcanisation process inside the vulcanisation apparatus allows simplifying the application operations, but above all more easily obtaining the correct positioning of the decorative element 120 on the surface of the sidewall 108 of the tyre 100, avoiding overflows and/or deviations resulting from the application on the green sidewall or on the forming drum.

In particular, according to an aspect of the present invention, the decorative element 120 is prepared in the form of a layer by deposition of the elastomeric composition of the present invention on a plastic support consisting of polyolefins, such as polyethylene (PE) and polypropylene (PP), polyesters, such as polyethylene terephthalate (PET) and polyethylene terephthalate (PEN), polyamide, polyimide, perfluorinated polymers, such as polytetrafluoroethylene (PTFE), and polyurethanes (PU).

The plastic support provides the necessary support to the elastomeric composition layer during the subsequent processing steps. The plastic support is selected based on its temperature resistance features, in particular at the vulcanisation temperatures generally of between 150° C. and 180° C.

The plastic support is preferably made with polyethylene terephthalate (PET) or polyamides, such as, for example Nylon 6 or Nylon 66, with a thickness of between 10 and 150 micrometres (μm), preferably between 20 and 75 micrometres (μm).

The layer thus formed can be directly applied to the mould sidewall or optionally subjected to a partial pre-vulcanisation.

The pre-vulcanisation is carried out for a period of at least 1 hour, preferably at least 2 hours, at a temperature equal to or lower than 100° C., preferably lower than 90° C., more preferably lower than 80° C., but equal to or higher than 40° C., preferably higher than 50° C., and more preferably higher than 60° C.

The partial pre-vulcanisation gives the layer a sufficient consistency for the shaping thereof by removing part of it if the decorative element 120 consists of a plurality of letters, numbers or any discontinuous graphic sign or of significant extension, such as, for example, the mark of the manufacturer and/or the name of the product and/or annular strips. The removal of the layer portions to form the aforesaid words can be carried out with methods known in the art such as, for example, laser ablation or mechanical removal.

In the case in which the decorative element 120 consists of a more or less wide continuous layer covering a portion of or the whole sidewall, the layer coupled to the support may be directly applied to the mould sidewall, although also in this case it may undergo the pre-vulcanisation treatment.

The partial pre-vulcanisation of the layer also allows a thin layer of rubber-based inks to be printed on the surface of the layer itself for making the decorative element 120.

The layer with the plastic support is positioned on the mould sidewall with the exposed surface of elastomeric composition facing towards the inside of the vulcanisation apparatus, at the sidewall of the green tyre, and the plastic support adhered to the surface of the mould sidewall.

The vulcanisation apparatus is then closed, and the vulcanisation process is started, which consists in bringing the temperature inside the apparatus to a value of between 150° C. and 180° C. for a period of time between 10 seconds and 40 minutes, at the same time pressing the outer surface of the tyre against the walls of the moulding cavity, during which the layer of elastomeric composition of the decorative element and the sidewall of the green tyre co-vulcanise, making a mutual adhesion of the surfaces facing each other.

Some tests performed on tyres made according to the invention are described below.

Example 1

Tyre Preparation

The tyres used were Pirelli P ZERO™ 245/35ZR21 (96Y) front (tyre 1), and Pirelli P ZERO™ 285/30ZR21 (100Y) rear (tyre 2).

The tyres used were made according to the process of the present invention and included the sidewalls made with the compound described in table 1 and the decorative elements, consisting of two continuous strips about one third of the circumference of the sidewall arranged symmetrically one with respect to the other, the writing "PIRELLI", and the writing "P ZERO", 300 μm (micrometres) thick, made with the compounds described in table 2.

The values of tables 1 and 2 are expressed in phr.

TABLE 1

| Component | Quantity |
|---|---|
| Natural rubber | 40 |
| Butadiene rubber | 60 |
| Carbon black 660 | 50 |
| Tackifying resin | 2 |
| Stearic acid | 2 |
| Zinc oxide | 2.85 |
| Non-staining antioxidant | 8 |
| Retardant | 0.1 |
| Primary accelerant | 0.8 |
| Sulphur | 2 |

Butadiene rubber: Neocis BR40, Versalis
Carbon black: N660, Columbian
Tackifying resin: Quintone A100, Zeon Corporation
Non-staining antioxidant: Irganox 1520L, 4,6-bis[(octylthio)methyl]-o-cresol, BASF
Retardant: N-cyclohexylthiophthalimide
Primary accelerant: CBS, N-cyclohexyl-2-benzothiazil sulphenamide, Huathai

TABLE 2

| Component | Compound A | Compound B |
|---|---|---|
| Natural rubber | 50 | 65 |
| Bromobutyl rubber | 50 | — |
| Styrene-butadiene rubber | — | 35 |
| Silica | 40 | 20 |
| Silane Si69 | 3 | 6 |
| Titanium oxide | 10 | 20 |
| Talc | 15 | 30 |
| Plasticizer | 10 | 10 |
| Antioxidant 1 | 3 | 3 |
| Antioxidant 2 | 2 | |
| Tackifying resin | 3 | |
| Orange pigment | 10 | 10 |
| Stearic acid | 2 | 2 |
| Zinc oxide | 5 | 3 |
| Primary accelerant | 2 | 1 |
| Thiazolic accelerant | | 3 |
| Sulphur | 0.6 | — |
| Sulphur donor | 1.5 | — |

Styrene-butadiene rubber: SBR 1502 = ESBR non-extended oil (23.5% Styrene)
Plasticiser: wax, paraffinic oil
Silica: Zeosil 185 GR by Solvay
Primary accelerant: Huathai CBS cyclohexyl benzothiazole sulphenamide
Thiazolic accelerant: Rhenogran MBTS 80 by Rheinchemie
Antioxidant 1: IRGANOX 1520 L by BASF
Antioxidant 2: Vulcazon AFS/LG 3,9-Di-(3-Cyclohexenyl)-2,4,8,10-Tetraoxaspiro(5.5) Undecane by Lanxess
Sulphur donor: Vultac TB710 of poly-tert-butylphenoldisulphide and stearic acid by ARKEMA The tyres with the decorative elements made with compound A are indicated with 1A and 2A, while the tyres with the decorative elements made with compound B are indicated with 1B and 2B.

Example 2

Dynamic Ozone Tests on the Tyre

The dynamic test of exposure to ozone was carried out on tyres inflated to a pressure of 2.6 bar (controlled) stressed with a constant vertical load equal to 50% of the load index, and a constant speed of 120 km/h, subjecting it to ozone flow of 3 g/m$^3$ directly on the sidewall with nozzle at a distance of 7 cm.

The test was carried out on an Indoor machine with a 1.7-metre road wheel in a conditioned environment with a controlled temperature between 28° C. and 30° C.

The overall test lasted 200 hours. At the end of the test, the covers were examined to check for defects on the decorative elements (detachments, cracks, change of color), and the results are summarised in the following table 3.

TABLE 3

| Tyre | Detachments | Cracking | Change of color |
|---|---|---|---|
| 1A | No | No | No |
| 1B | No | No | No |
| 2A | No | No | No |
| 2B | No | No | No |

Figure 2:
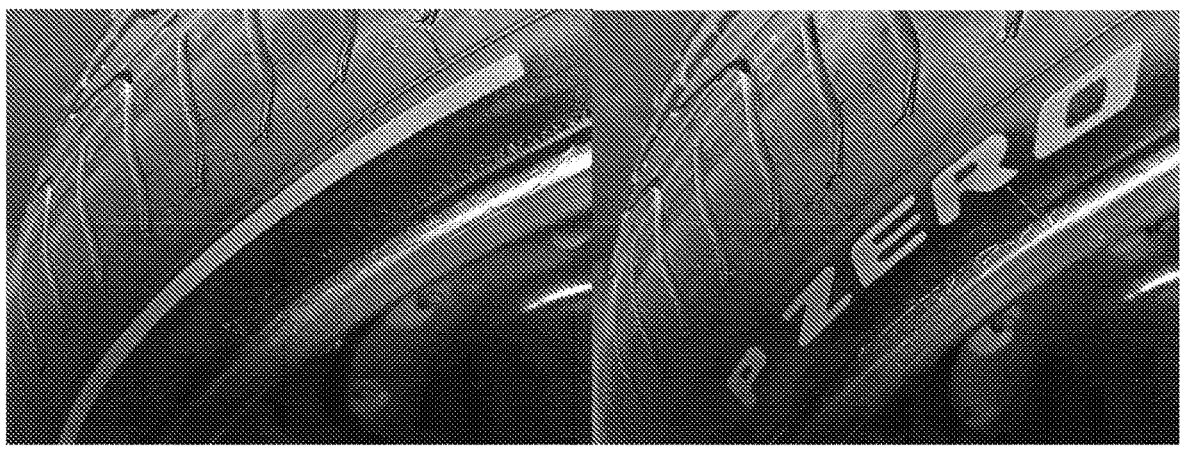
FIG. 2 shows a photograph of a tyre according to an embodiment of the present invention at the end of the dynamic ozone test of example 2.

FIG. 2 shows a photograph of a tyre at the end of the test. All tested tyres passed the test without any appreciable damage to the decorative elements.

Example 3

Endurance Tests on the Tyre

The endurance tests consist of a high-speed test and a fatigue test.

Speed Test

The high-speed test was carried out on tyres inflated to a pressure of 3.6 bar. The test is carried out on an Indoor machine with a 1.7 m diameter road wheel with camber angle equal to 2° in a conditioned environment with a controlled temperature of 27.5° C.±2.5° C.

During the test, the tyres were stressed with a constant vertical load of 575 kg (tyre 1) or 650 kg (tyre 2), at speeds varying over time from 240 to 320 km/h.

The overall test lasted 2 hours and 20 minutes. At the end of the test, the covers were examined to check for defects on the decorative elements (detachments, cracks, change of color), and the results are summarised in the following table 4.

TABLE 4

| Tyre | Detachments | Cracking | Change of color |
|---|---|---|---|
| 1A | No | No | No |
| 1B | No | No | No |
| 2A | No | No | No |
| 2B | No | No | No |

All tested tyres passed the test without any appreciable damage to the decorative elements.

Fatigue Test

The fatigue test was performed on tyres inflated to a (controlled) pressure of 3 bar stressed with constant vertical load equal to 160% of the load index, and constant speed at 120 km/h.

The test was carried out on an Indoor machine with a 1.7-metre road wheel in a conditioned environment with a controlled temperature of 27.5° C.±2.5° C. The test included stops for checking the tyres every 12 hours and continued until the cover broke (in the belt end area).

At the end of the test, the covers were examined to check for defects on the decorative elements (detachments, cracks, change of color), and the results are summarised in the following table 5.

TABLE 5

| Tyre | Detachments | Cracking | Change of color |
|------|-------------|----------|-----------------|
| 1A | No | No | No |
| 1B | No | No | No |
| 2A | No | No | No |
| 2B | No | No | No |

Figure 3:
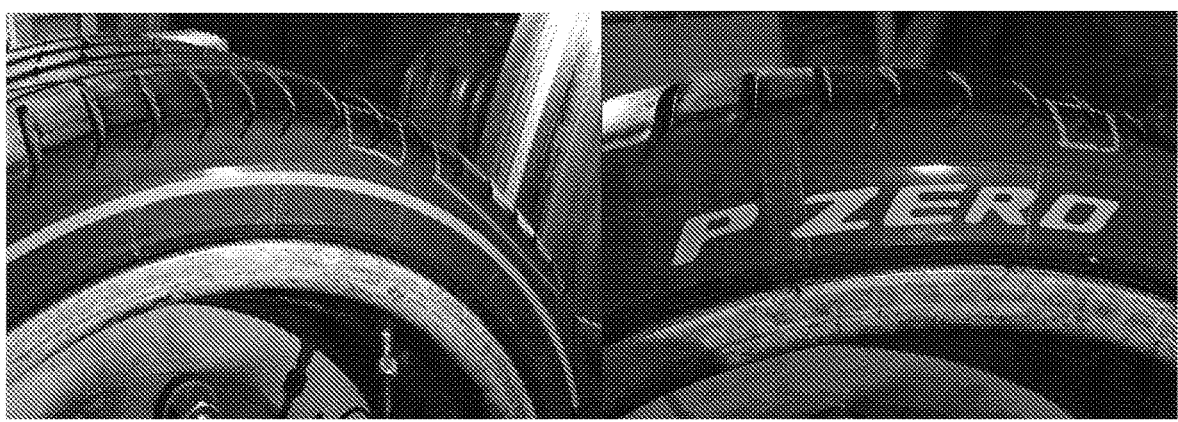
FIG. 3 shows a photograph of a tyre according to an embodiment of the present invention at the end of the fatigue test of example 3.

FIG. 3 shows a photograph of a tyre at the end of the test. All tested tyres passed the test without any appreciable damage to the decorative elements.

Example 4

Endurance Tests on the Road

In view of the good results obtained and illustrated in example 3, tests were carried out with tyre engagement on the road.

The test took place on a private circuit at an average speed of about 200 km/h for a total of about 150 km. The test was performed with a Maserati Ghibli provided with the tyres 1A and 2A inflated to a pressure of 2.5 bar.

The test allowed evaluating the systems under very high mechanical stress conditions (load, speed and cornering), which led to an increase in the final sidewall temperature up to about 60° C. (external ambient temperature 28° C.).

At the end of the test, the covers were examined to check for defects on the decorative elements (detachments, cracks, change of color), and the results are summarised in the following table 6.

TABLE 6

| Tyre | Detachments | Cracking | Change of color |
|------|-------------|----------|-----------------|
| 1A | No | No | No |
| 2A | No | No | No |

All tested tyres passed the test without any appreciable damage to the decorative elements.

Figure 4:
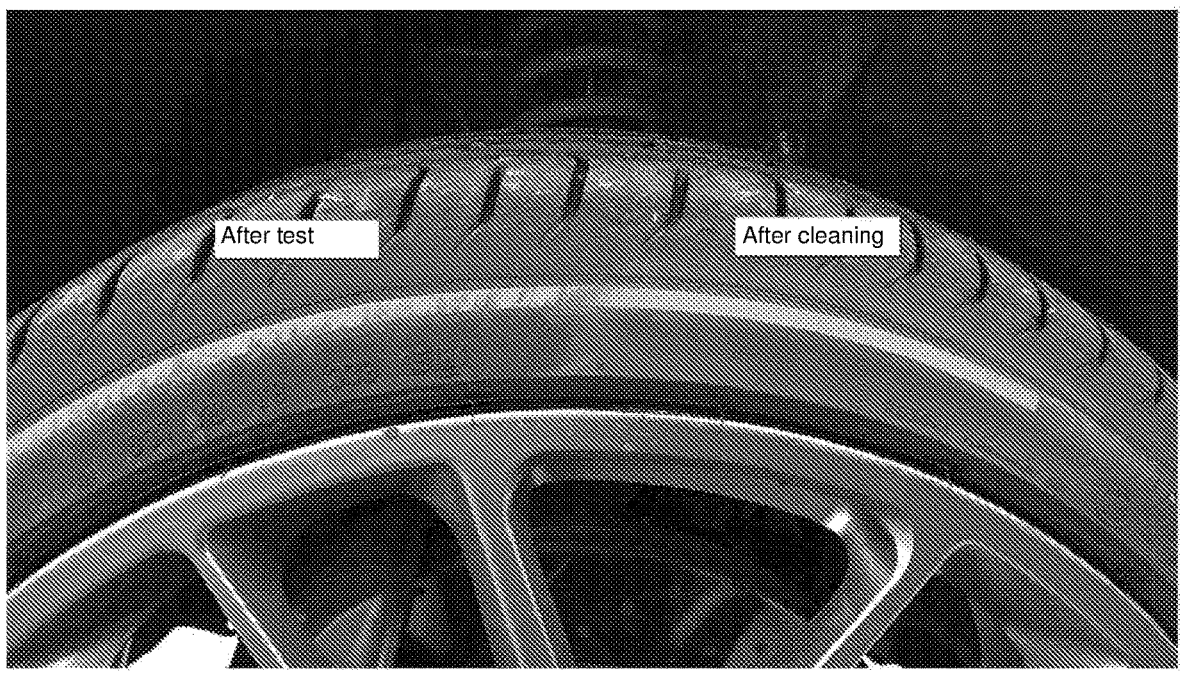
FIG. 4 illustrates the comparison photo of a tyre according to an embodiment of the present invention at the end of the road resistance test of example 4 before and after cleaning.

The decorative elements at the end of the test were dirty, black streaks, resulting from the passage of the tyres on the curbs of the circuit, but a cleaning treatment with heptane solvent brought the decorative elements back to their original appearance without signs of alteration or discoloration. FIG. 4 shows the comparison of a tyre before and after the cleaning operation.

The invention claimed is:

1. A tyre comprising:
 a carcass structure comprising a carcass ply having opposite lateral edges associated to respective bead structures;
 a tread band applied in a radially outer position with respect to the carcass structure;
 a pair of sidewalls applied laterally on opposite sides of the carcass structure; and
 at least one colored decorative element having a thickness equal to or greater than 200 μm applied on at least one side of the pair of sidewalls,
 wherein the pair of sidewalls comprises an elastomeric composition comprising (i) at least one diene elastomeric polymer, and (ii) a non-staining ozone protection system,
 wherein the at least one colored decorative element is made of a cross-linkable elastomeric composition comprising:
 (i) 100 phr of elastomeric polymer comprising from 30 phr to 70 phr of natural and/or synthetic isoprene rubber, and from 30 phr to 70 phr of a rubber chosen from butyl rubber, halobutyl rubber, butadiene rubber, styrene-butadiene rubber, and mixtures thereof, and
 (ii) from 5 phr to 120 phr of at least one reinforcement filler,
 wherein the at least one colored decorative element is directly applied green or partially vulcanized to the at least one sidewall of the pair of sidewalls of the tyre when green, and co-vulcanized with the tyre,
 wherein the non-staining ozone protection system consists of at least one phenolic antioxidant in an amount equal to or greater than 3 phr and at least one cyclic acetal or enol-ether antioxidant in an amount equal to or greater than 1 phr, and the non-staining ozone protection system is free of (i) antioxidants and/or antiozonants based on aromatic amines, (ii) waxes and (iii) other polymeric static protective agents,
 wherein the at least one phenolic antioxidant is selected from the group consisting of: pentaerythrityl tetrakis [3-(3,5-di-t-butyl-4-hydroxyphenyl)propionate], 2,2-thio-diethylene bis-[(3-(3,5-di-t-butyl-4-hydroxyphenyl)propionate)], octadecyl-3-(3,5-di-t-butyl-4-hydroxyphenyl)propionate, isooctyl-3-(3,5-di-t-butyl-4-hydroxyphenyl)propionate, 1,3,5-trimethyl-2,4,6-tris (3,5-di-t-butyl-4-hydroxybenzyl)benzene, 4,6-bis (dodecylthiomethyl)-o-cresol, 4,6-bis(octytiomethyl)-o-cresol, triethyleneglycol-bis[(3-(3-t-butyl-5-methyl-4-hydroxyphenyl)propionate)], 1,6-hexanediol-bis[(3-(3,5-di-t-butyl-4-hydroxyphenyl)propionate], and 4-{[4,6-bis(octylsulphanyl)-1,3,5-triazin-2-yl]amino]-2,6-di-t-butylphenol, and
 the at least one cyclic acetal or enol-ether antioxidant is selected from the group consisting of 3,9-di-3-cyclohexen-1-yl-2,4,6,10-tetraoxaspyro[5.5]undecane, and cyclohexen-3-ylidenmethyl-benzylether.

2. The tyre according to claim 1, wherein the 100 phr of elastomeric polymer comprises from 40 phr to 60 phr of natural and/or synthetic isoprene rubber.

3. The tyre according to claim 1, wherein the 100 phr of elastomeric polymer comprises 40 phr to 60 phr of butyl and/or halobutyl rubber.

4. The tyre according to claim 1, wherein the 100 phr of elastomeric polymer comprises 40 phr to 60 phr of butadiene and/or styrene-butadiene rubber.

5. The tyre according to claim 1, wherein the 100 phr of elastomeric polymer comprises 40 phr to 60 phr of a mixture of butyl or halobutyl rubber and butadiene and/or styrene-butadiene rubber.

6. The tyre according to claim 1, wherein the cross-linkable elastomeric composition further comprises 5 phr to 120 phr of at least one light reinforcement filler for 100 phr of elastomeric polymer.

7. The tyre according to claim 6, wherein the at least one light reinforcement filler is chosen from silica, alumina, titanium dioxide, aluminosilicates, bentonite, calcium carbonate, kaolin, talc, gypsum, barium sulphate, and mixtures thereof.

8. The tyre according to claim 6, wherein the cross-linkable elastomeric composition further comprises an amount less than or equal to 100 phr of at least one coloring agent for 100 phr of elastomeric polymer.

9. The tyre according to claim 6, wherein the cross-linkable elastomeric composition further comprises 1 phr to 5 phr of carbon black for 100 phr of elastomeric polymer.

10. The tyre according to claim 1, wherein the cross-linkable elastomeric composition further comprises 5 phr to 120 phr of at least one dark reinforcement filler for 100 phr of elastomeric polymer.

11. The tyre according to claim 10, wherein the dark reinforcement filler is carbon black.

12. The tyre according to claim 10, wherein the at least one colored decorative element is molded with at least one rubber-based ink layer.

13. The tyre according to claim 12, wherein the rubber-based ink layer has a thickness equal to or greater than 5 µm.

14. The tyre according to claim 12, wherein the rubber-based ink layer has a thickness equal to or less than 50 µm.

15. The tyre according to claim 12, wherein the rubber-based ink comprises a dye or pigment dispersed in a polymeric base comprising a rubber chosen from natural rubber, synthetic rubber, butadiene rubber, styrene-butadiene rubber, butyl rubber, halobutyl rubber, and mixtures thereof.

16. The tyre according to claim 1, wherein the at least one colored decorative element has a thickness equal to or less than 800 µm.

17. The tyre according to claim 1, wherein the cross-linkable elastomeric composition further comprises at least 0.5 phr of at least one coloring agent.

18. The tyre according to claim 1, wherein the cross-linkable elastomeric composition further comprises a non-staining ozone protection system.

* * * * *